(12) United States Patent
Abdo et al.

(10) Patent No.: US 9,639,963 B2
(45) Date of Patent: May 2, 2017

(54) COMMAND REMOTING TECHNIQUES

(75) Inventors: Nadim Y. Abdo, Bellevue, WA (US);
Onur Filiz, Redmond, WA (US);
Daniel N. Wood, Seattle, WA (US);
Max Alan McMullen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1409 days.

(21) Appl. No.: 12/330,330

(22) Filed: Dec. 8, 2008

(65) Prior Publication Data
US 2010/0141650 A1 Jun. 10, 2010

(51) Int. Cl.
*G06T 17/00* (2006.01)
*G06T 9/00* (2006.01)

(52) U.S. Cl.
CPC .................................... *G06T 9/001* (2013.01)

(58) Field of Classification Search
CPC ....................................................... G06T 17/00
USPC .......................................................... 345/420
See application file for complete search history.

(56) References Cited

U.S. PATENT DOCUMENTS

| | | | |
|---|---|---|---|
| 6,072,496 A | 6/2000 | Guenter et al. | |
| 6,271,858 B1 * | 8/2001 | Dalal et al. | 345/582 |
| 6,593,925 B1 | 7/2003 | Hakura et al. | |
| 6,594,701 B1 * | 7/2003 | Forin | 709/232 |
| 7,170,512 B2 | 1/2007 | Southwell et al. | |
| 7,298,371 B2 | 11/2007 | Doyle | |
| 2001/0055032 A1 | 12/2001 | Saito et al. | |
| 2003/0184555 A1 | 10/2003 | Fraser | |
| 2004/0024973 A1 * | 2/2004 | Chron et al. | 711/144 |
| 2005/0033988 A1 * | 2/2005 | Chandrashekhar et al. | 713/201 |
| 2005/0052455 A1 * | 3/2005 | Long et al. | 345/422 |
| 2005/0086300 A1 * | 4/2005 | Yeager et al. | 709/204 |
| 2005/0235059 A1 * | 10/2005 | Eydelman et al. | 709/224 |
| 2005/0243087 A1 * | 11/2005 | Aharon | 345/420 |
| 2006/0039466 A1 * | 2/2006 | Emerson et al. | 375/240.01 |
| 2006/0069797 A1 | 3/2006 | Abdo et al. | |
| 2006/0184545 A1 | 8/2006 | Suzuki | |

(Continued)

FOREIGN PATENT DOCUMENTS

| | | |
|---|---|---|
| CN | 1526122 A | 9/2004 |
| CN | 101031071 A | 9/2007 |

(Continued)

OTHER PUBLICATIONS

Kevin R. Harris "The Absolute Beginner's Guide to Direct3D", Chapter 05: 3D Primitives and Vertex Buffers, http://www.codesampler.com/d3dbook/chapter_05/chapter_05.htm, 2003.*
Arturo San Emeterio Campos "Move to front", http://www.arturocampos.com/ac_mtf.html, dated Jul. 24, 1999.*
"Microsoft Windows CE 5.0," http://www.advantech.com.cn/ecg/074/WinCE%205.0.doc, downloaded 2008, 1-33.

(Continued)

*Primary Examiner* — Vivek Srivastava
*Assistant Examiner* — Sibte Bukhari
(74) *Attorney, Agent, or Firm* — Baker & Hostetler LLP

(57) ABSTRACT

Techniques for improved command level remoting are disclosed. In embodiments of the invention, commands to generate vertices are sent in a terminal service session. As commands to draw vertices are generated by a server to be sent to a client to display, they are analyzed by the server. Where some of those vertices have been previously sent to the client, such as to generate a previous bitmap image, the server determines not to send those vertices to the client, and sends the client the new vertices.

20 Claims, 15 Drawing Sheets

(56) References Cited

U.S. PATENT DOCUMENTS

| | | | |
|---|---|---|---|
| 2006/0290695 A1* | 12/2006 | Salomie | 345/420 |
| 2007/0046980 A1 | 3/2007 | Coleman et al. | |
| 2007/0124474 A1 | 5/2007 | Margulis | |
| 2007/0250572 A1* | 10/2007 | Paila et al. | 709/204 |
| 2008/0163263 A1 | 7/2008 | Li et al. | |
| 2009/0043846 A1* | 2/2009 | Inoue | 709/204 |

FOREIGN PATENT DOCUMENTS

| | | |
|---|---|---|
| CN | 101217668 A | 7/2008 |
| JP | 2000-222598 | 8/2000 |
| JP | 2002-08060 | 1/2002 |
| JP | 2002-517859 | 6/2002 |
| JP | 2006-236334 | 9/2006 |

OTHER PUBLICATIONS

"Block Compression (Direct3D 10)," http://msdn.microsoft.com/en-us/library/bb694531(VS.85).aspx, Aug. 2008, 1-12.

Roimela et al., "High Dynamic Range Texture Compression," http://research.nokia.com/files/hdrpaper-preprint.pdf, 2006, 25(3), 1-6.

"Windows Vista Service Pack 1," http://www.diraction.ch/shopdocs/files/Whats%20NEW%20in%20Windows%20Vista%20Service%20Pack%201.pdf, downloaded 2008, 1-11.

"Latest DirectX 9 Installer Download from Microsoft-DirectX 9.23.1350," http://www.techmixer.com/latest-directx-9-installer-downloaded-from-microsoft-directx-9231350/, Jun. 10, 2008, 1-8.

PCT Application No. PCT/US2009/062750 : International Search Report and Written Opinion of the International Searching Authority, Jun. 17, 2010, 11 pages.

* cited by examiner

COMMAND REMOTING TECHNIQUES

BACKGROUND

Terminal services provide techniques for allowing access to applications and data stored on servers. User input is sent over a network connection to a server and audio and graphics are sent from the server to a client. Over the years different techniques have been developed to remote graphics such as command level remoting and bitmap level remoting.

Bitmap level remoting is generally considered to be the easier of the two techniques to implement. In bitmap remoting, the graphics processing is performed on the terminal server and the final image, e.g., an array of pixel values that forms a bitmap, is compressed and sent over the network to the client. This technique requires a server that has enough computational power to render images for one or more clients.

Command level remoting on the other hand offloads the graphics processing to the client. Primitives, e.g., vertices that can be processed by a driver and executed by a graphics processor, can be captured and sent to the client. This reduces the processing power required to remote graphics, however more bandwidth is needed to transport the data representing the 3D graphics primitives than using bitmap remoting. Accordingly, techniques for reducing the bandwidth required to effectuate command level remoting are desirable.

SUMMARY

An example embodiment of the present disclosure describes a method. In this example, the method includes, but is not limited to storing vertices for a plurality of primitives in memory; determining that at least a portion of the vertices have not been sent to a terminal server client; and sending the determined portion of the vertices to the terminal server client. In addition to the foregoing, other aspects are described in the claims, drawings, and text forming a part of the present disclosure.

An example embodiment of the present disclosure describes a method. In this example, the method includes, but is not limited to storing vertices for a plurality of primitives, each primitive defined by at least one vertex; encoding the vertices with a move to front coder; and sending the encoded vertices to a terminal server client. In addition to the foregoing, other aspects are described in the claims, drawings, and text forming a part of the present disclosure.

An example embodiment of the present disclosure describes a method. In this example, the method includes, but is not limited to storing graphics data in memory, the graphics data including textures and vertices; determining, based on a comparison between the graphics data stored in memory and graphics data that were previously sent to a terminal server client, that at least a portion of the graphics data in the memory have changed; preconditioning at least a portion of the graphics data that have changed; and sending the graphics data that have changed to a terminal server client. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
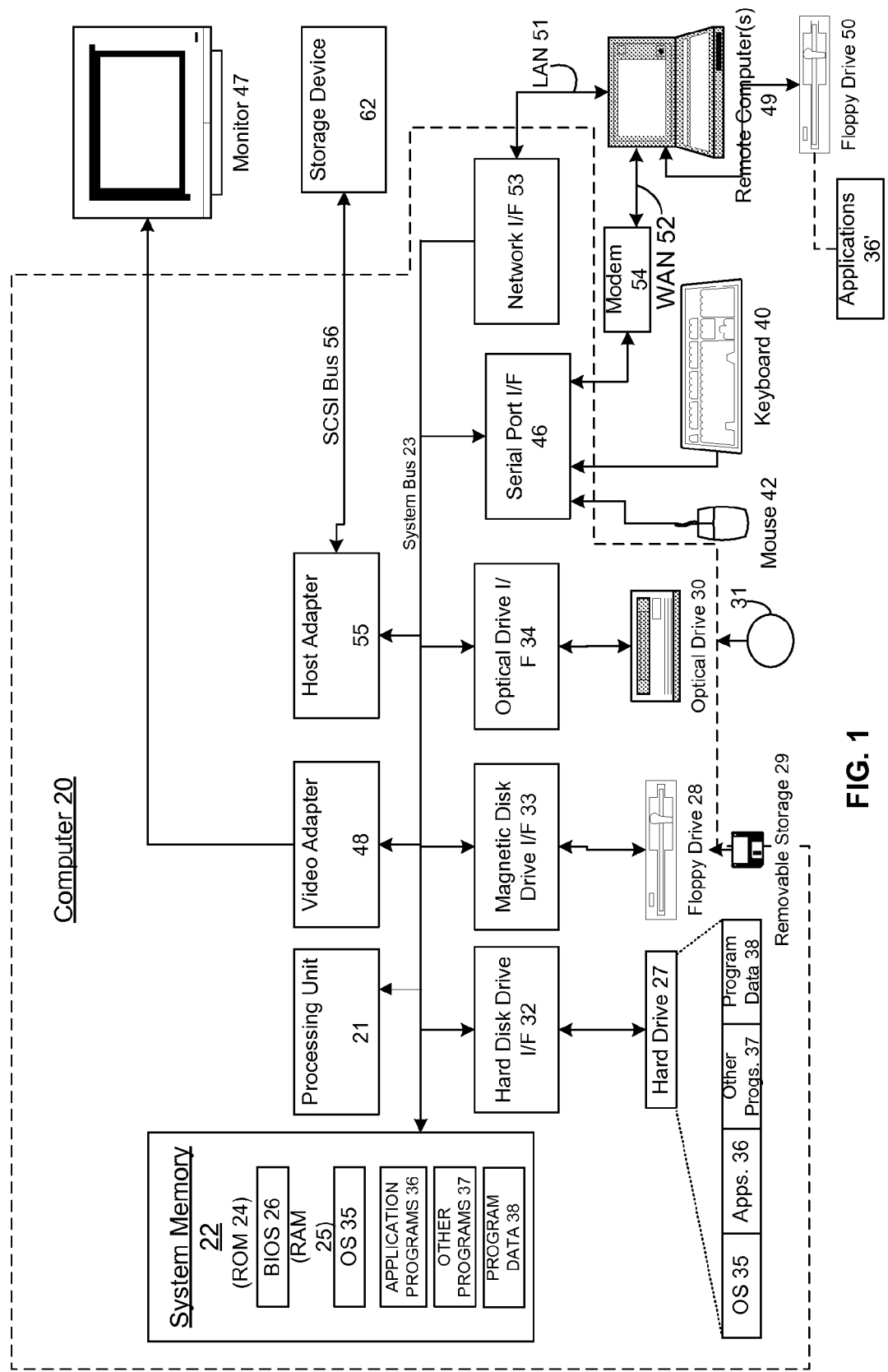
FIG. 1 depicts an example computer system wherein aspects of the present disclosure can be implemented.

Embodiments of the present disclosure may execute on one or more computers. FIG. 1 and the following discussion is intended to provide a brief general description of a suitable computing environment in which the disclosure may be implemented. One skilled in the art can appreciate that the computer system of FIG. 1 can in some embodiments effectuate the server 200 and client 201 of FIG. 2. In these example embodiments, the server 200 and client 201 can include some or all of the components described in FIG. 1 and circuitry configured to instantiate specific aspects of the present disclosure.

The term circuitry used through the disclosure can include hardware components such as hardware interrupt controllers, hard drives, network adaptors, graphics processors, hardware based video/audio codecs, and the firmware/software used to operate the hardware for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
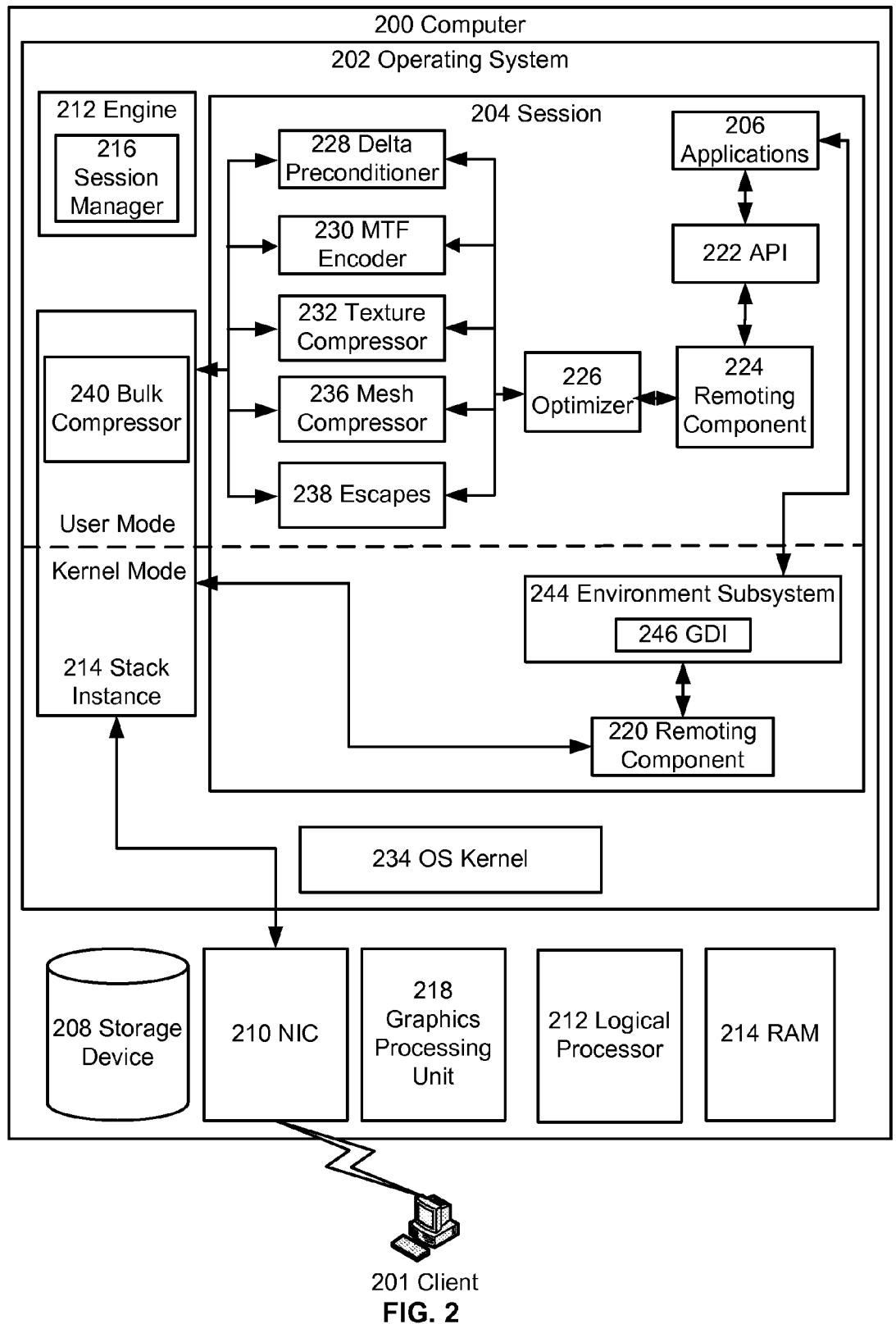
FIG. 2 depicts an operational environment for practicing aspects of the present disclosure.

Referring now to FIG. 2, it generally illustrates an example operating system 202 including a terminal service session 204 that can be used in embodiments. One skilled in the art can appreciate that the example operating system 200 can be effectuated by a computer such as computer 20 of FIG. 1. As shown by the figure, underlying hardware storage device 208, e.g., hard drive, network interface card (NIC) 210, graphics processing unit 218, at least one logical processor 212, and RAM 214 can be provided.

Terminal services can be provided to at least one client such as client 201 (while one client is depicted terminal services can be provided to more clients) in embodiments. The example client 201 can include a computer terminal that is effectuated by hardware configured to direct user input to the terminal server session and display user interface information generated by the session. In another embodiment, client 201 can be effectuated by a computer that includes similar elements as those of computer 20 FIG. 1. In this embodiment, client 201 can include circuitry configured to effect operating systems and circuitry configured to emulate the functionality of terminals, e.g., a remote desktop client application that can be executed by one or more logical processors 212. One skilled in the art can appreciate that the circuitry configured to effectuate the operating system 202 can also include circuitry configured to emulate a terminal.

Operating system 202 can include instructions that can configure a processor 212 to generate sessions. Briefly, a session can generally include user mode processes applications 206 such as videogames, word processing programs, web browsers, user interfaces (windows, dialog boxes, desktop, etc.), media players and the like. Applications 206 can be effectuated by various subsystems, e.g., executing processes, that can provide a platform for applications 206 to execute and interact with a kernel 234. One such subsystem, e.g., instructions, is environment subsystem 244 that will be explained in more detail below. A session can include a shell and a user interface (rendered by a user interface process), the subsystems that track mouse movement within the desktop, the subsystems that translate a mouse click on an icon into commands that effectuate an instance of a program, etc.

Generally, a session can be generated on a user by user basis when, for example, the operating system 202 receives a connection request over a network connection from a client such as client 201. Generally, a connection request can first be handled by a transport stack, e.g., a remote desktop protocol stack (RDP). The transport stack can include instructions that can configure processor 212 to listen for connection messages on a certain port and forward them to engine 212. When sessions are generated the transport logic can be executed and remote desktop protocol stack instances for each session such as stack instance 214 can be instantiated. Generally, remote desktop protocol stack instance 214 can be configured to route output to client 201 and route client input to environment subsystem 244.

During the session creation process a session manager 216 can be executed by logical processor 212 and the processor can initialize and manage each session by, for example, generating a session identifier for a session space; adding the session identifier to a table; assigning memory to the session space; and generating system environment variables and instances of subsystem processes in memory assigned to the session space.

As shown by the figure, in an embodiment applications 206 can execute within user mode of the session 204 and can use two distinct rendering techniques such as bitmaps generated by a graphics display interface (GDI) 246, 3D graphics, or a combination of both. The GDI 246 is useful for generating 2D images such as text and windows. The GDI 246 can be associated with a display driver that can generate bitmap images in response to receiving an array of bits from applications 206. For example, an application may emit an array that can be processed by the display driver and used to render pixels representing color values. As is shown by the figure, a remoting component 220 can capture the bitmap output by the GDI 246 and can send it to the stack instance 214.

Continuing with the description of FIG. 2, applications 206 may additionally take advantage of 3D graphics supported by a graphics processing unit made by made by one of a plurality of hardware vendors. Since different hardware vendors use different architectures and commands, a graphics driver architecture can be made that abstracts the hardware so that developers can write a single application that works with any graphics card. In this example the application may access the features of the graphics processing unit of the client 201 via an application programming interface 222 (API) such as Direct3D from Microsoft®. The API primitives can be sent to the client 201; translated by a driver of the client into commands that can be executed by the GPU of the client; and executed by the GPU of the client. Generally the API 222 outputs graphics data, e.g., values, vertices (32 bit values that represent vertices of triangles) and/or textures, e.g., digital representations of surfaces of objects that can have 3D properties such as how transparent and reflective the objects are. Generally, the textures can be considered bitmaps that can be applied to primitives. That is, an application can create an object that looks like a tree and apply a texture to the tree to make it appear to have bark. Another example could include applying grass, dirt, and rocks to a set of 3D primitives that form a hill.

Graphics data can be generated by the API 222 and stored in buffers, e.g., pages of memory, and textures can be loaded from art files and stored in other pages of memory. When an application executes it can request memory to use as vertex buffers and memory used to store textures. The application can also declare how it is going to use the memory, e.g., what type of data it is going to store in the buffer. For example, an application, such as a videogame, may use a dynamic vertex buffer to store vertices for an avatar and a static buffer for storing data that will not change often such as building data.

In a terminal server embodiment, a remoting component 224 can be used to capture the graphics data output by the API 222 and various techniques can be used in order to reduce the amount of graphics data sent over the network to the client 201 such as for example, optimizer 226, a delta preconditioner 228, a move to front encoder 230, one or more texture compressors 232, a mesh compressor 236, and one or more escapes 238. In example embodiments the various components 226-238 can be effectuated by instructions that can be executed by one or more logical processors. Also, while components 226-338 are shown as separate, in one or more embodiments the components can be a single software component. Additionally, in one or more embodiments each component 226-338 can be executed on one or more threads of the application 206, or the stack instance 214 (not shown). Moreover, while certain components are show in parallel, the disclosure is not limited to such an arraignment and in other embodiments one or more components may be in series with other components. As graphics data is generated by the API 222 it can be processed by one or more of the preceding components depending on the type of graphics data and then sent to a bulk compressor 240. The bulk compressor 240 can be configured to compress the graphics data and then the compressed data can be sent to a client 201 via the NIC 210.

The following are a series of flowcharts depicting implementations of processes. For ease of understanding, the flowcharts are organized such that the initial flowcharts present implementations via an overall "big picture" viewpoint and subsequent flowcharts provide further additions and/or details.

Figure 3:
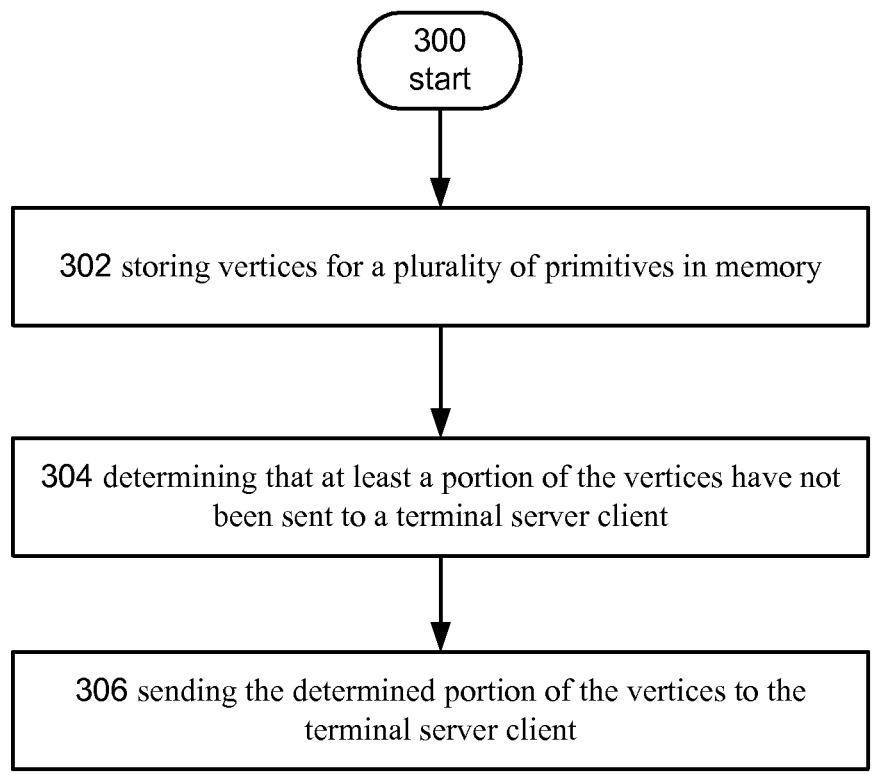
FIG. 3 depicts an operational procedure 300 for practicing aspects of the present disclosure.

Referring now to FIG. 3, it depicts an operational procedure for practicing aspects of the present disclosure including the operations 300, 302, 304, and 306. As shown by the figure, operation 300 begins the operational procedure and operation 302 shows storing vertices for a plurality of primitives in memory. Referring to FIG. 2, vertex data, e.g., 32 bit values indicative of vertices, can be stored in a vertex buffer, e.g., one or more pages of memory in RAM 214 and/or memory of the graphics processor 218. In an embodiment the vertex data can be generated by, for example, the API 222 in response to receiving API constructs from an application such as, for example, a videogame, media player, CAD program, user interface, etc. That is, an application could pass the API 222 one or more constructs and the API 222 could generate thousands of primitives and store them in one or more vertex buffers.

Continuing with the description of FIG. 3, operation 304 shows determining that at least a portion of the vertices have not been sent to a terminal server client. For example, and continuing with the previous example, when applications map vertex buffers a process, such as for example, the optimizer 226 can be executed by the logical processor 212 and the processor can discover that at least a portion of the vertices stored in the vertex buffer have not been sent to a terminal server client 201. For example, a huge amount of data may have been generated by the application, e.g., thousands and thousands of primitives, in between client updates, and the optimizer 226 can be configured to determine what portion of the data is needed to render the difference between what has been sent to the client 201 and what has changed.

As way of example, an application, when mapping a vertex buffer, may operate in very different ways depending on how it was coded by a developer. For example, it is perfectly acceptable for an application to map a portion of the buffer, then add to the buffer, then overwrite a portion of the data in the buffer, then completely overwrite the contents of the vertex buffer. The application can issue draw commands for the contents of the entire buffer or for a subset of the buffer. Or put another way, it is difficult to estimate how an application will behave. Since the behavior of the application is not predictable a naïve approach would involve sending all the vertices in the buffer after each un-map operation. However, in this example the optimizer 226 can, after an un-map operation for example, determine which portion of the vertices in the vertex buffer have changed.

Continuing with the description of FIG. 3, operation 306 shows sending the determined portion of the vertices to the terminal server client. For example, and referring to FIG. 2, the network interface card 210 can send the vertices in the buffer that have changed to the terminal server client 201. In this example, since the amount of vertices that need to be sent over the network has been reduced the total bandwidth necessary to effectuate command remoting has been decreased.

Figure 4:
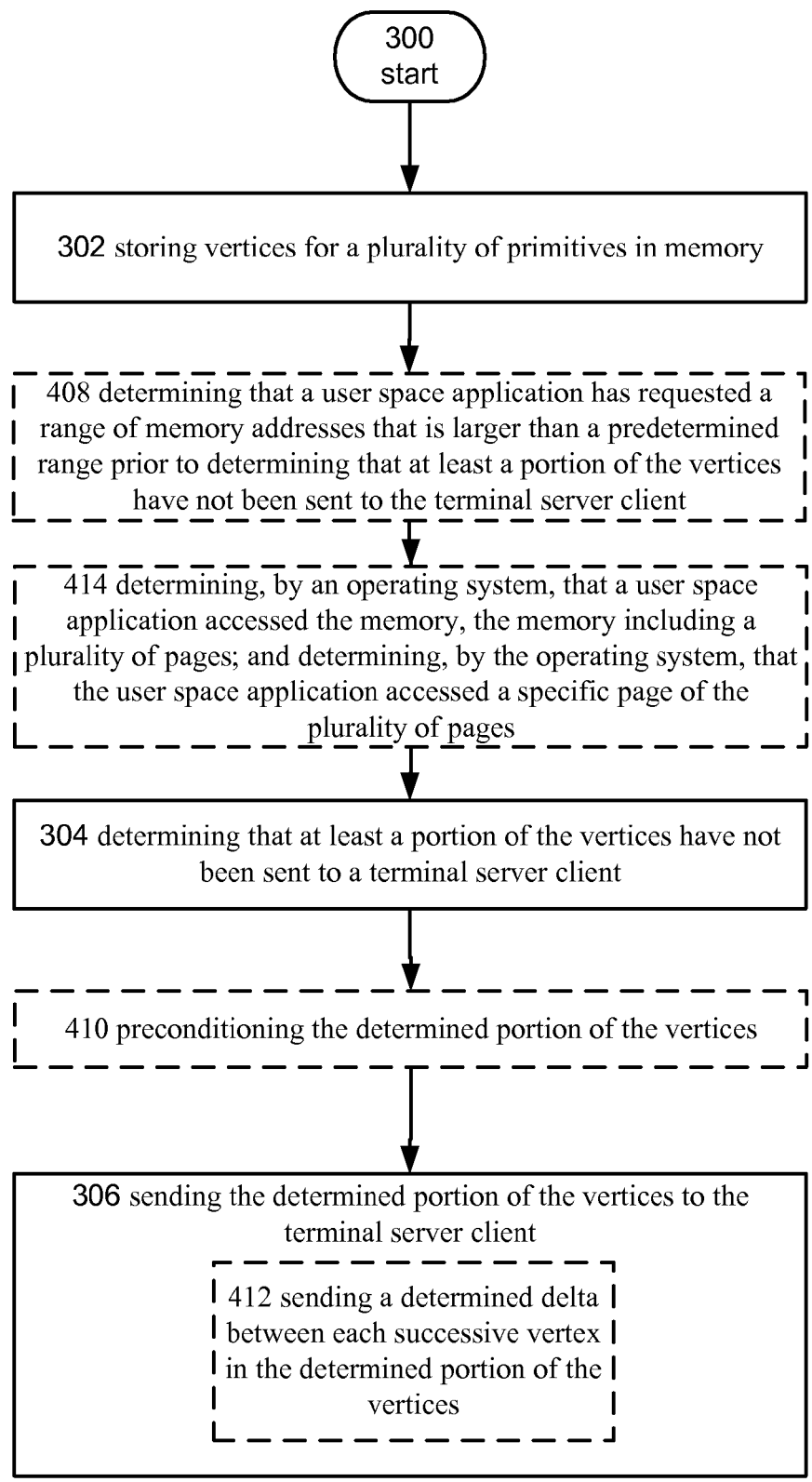
FIG. 4 depicts an alternative embodiment of the operational procedure 300 of FIG. 3.

Referring now to FIG. 4, it shows an alternative embodiment of the operational procedure 300 of FIG. 3 including the additional operations 408, 410, 412, and 414. Referring to operation 408, it shows determining that a user space application has requested a range of memory addresses that is larger than a predetermined range prior to determining that at least a portion of the vertices have not been sent to the terminal server client. Referring to FIG. 2, the optimizer 226 can be configured to scan the vertex buffers after it is determined that the user space application is using more than a predetermined amount of address spaces. For example, scanning vertex buffers costs computer cycles and if the application indicates that it will send small amounts of data, e.g., 20 bytes, it is more efficient to send the bytes instead of identifying the changed portion of data during each update. For example, the application can create a buffer of a specified amount during an initialization process and set the size and how the buffer will be used. The processor 212 can execute the optimizer 226 and check the size and usage pattern. In this example the processor 212 can discover that the size of the buffer is set to be greater than a predetermined amount and determine to scan the contents of the buffer. In the same, or other embodiments, the size and type of buffer can be used to determine which optimizations are turned on. For example, depending on the size of the buffer, the optimizer 226 may enable page level scanning, byte level scanning, SIMD scanning, etc.

As one of skill in the art can appreciate, the predetermined threshold can vary based on the capabilities of computer system 200. For example, the predetermined threshold can be set at the bit level and the optimizer 226 can be used to scan every bit generated by the API 222. This would reduce the bandwidth used to transport changes to the client 201, however this would be cost an unacceptable amount of computer cycles for the benefit actually obtained. On the other hand, when most changes are not detected the amount of bandwidth needed to transport the data is increases. Thus, as one of skill can appreciate, the exact values can be set based on a tradeoff of bandwidth used vs. computer cycles used. Since memory and computational power is increasing values used today may not be relevant in the future, thus the exact thresholds are left to an implementer.

Continuing with the description of FIG. 4, operation 410 shows preconditioning the determined portion of the vertices. For example, in an embodiment of the present disclosure the vertices can be preconditioned for being compressed. In this example the values, e.g., the bits, that represent the vertices used to generate primitives can be translated into a different form such that the bulk compressor 240 can more easily identify patterns and thus give the bulk compressor 240 more opportunity to compress.

Referring again to FIG. 4, operation 412 shows sending a determined delta between each successive vertex in the determined portion of the vertices. For example, in an embodiment a delta preconditioner 228 can be used to precondition the vertices. For example, a determination can be made to process the vertices by the delta preconditioner 228 based on when vertices are detected and/or when an application sets a flag on the API 222. As was stated in previous paragraphs, each vertex can be represented as a value, e.g., a 32 bit float for example, and the preconditioner 228 can execute an operation, e.g., add, subtract, multiply, divide, on each successive vertex based on the previous vertex and output the deltas. As one of skill in the art can appreciate, subtraction of a 32 bit float from another 32 bit float is still a 32 bit float, thus the amount of data remains the same. However, by selectively preconditioning, the data can be placed into a format that can be more easily compressed by the bulk compressor 240. For example, if an array of vertices was [2, 4, 6, 8, 10, 12] the delta preconditioner could send the first value, and the successive deltas, namely an array of [2, 2, 2, 2, 2, 2]. While the bulk compressor 240 may be able to compress the first array, by preconditioning the data the bulk compressor 240 will probably be able to pick up more repeated patterns and thereby compress more data.

This technique is particularly useful in Direct2D, a Microsoft set of APIs built on top of Direct3D that uses 3D hardware to draw 2D images such as text, e.g., buttons menus, etc. The application using D2D can fill up the vertex buffers with line segments representing horizontal spans. Since the vertices are packed together to render a letter in a specific font the distance between each successive vertex may be very similar.

Referring again to FIG. 4, operation 414 shows determining, by an operating system, that a user space application accessed the memory, the memory including a plurality of pages; and determining, by the operating system, that the user space application accessed a specific page of the plurality of pages. According to an embodiment that executes operation 412, the operating system 202 can determine that a user space application, e.g., a videogame, accessed a specific page of memory that stores vertices. For example, the processor 212 can track each page of memory that it accesses and this information can be exposed to, for example, a memory manager of the kernel 234. In an embodiment the applications using API 222 can be identified and when an application maps a vertex buffer, backed by pages of memory, the pages that are accessed can be identified and reported to the optimizer 226.

In a specific example, a vertex buffer could be, for example, 16 k bytes and the buffer could be backed by 4 pages, each page being 4 k bytes. In this example, if the application maps the buffer, e.g., writes to the first page, the processor 212 can report this information to the operating system 202 and the specific page, e.g., the first page, can be reported to the optimizer 226. The optimizer 226 could determine, based on the info passed from the operating system 202, that the specific page includes vertices that have not been sent to a terminal server client.

Figure 5:
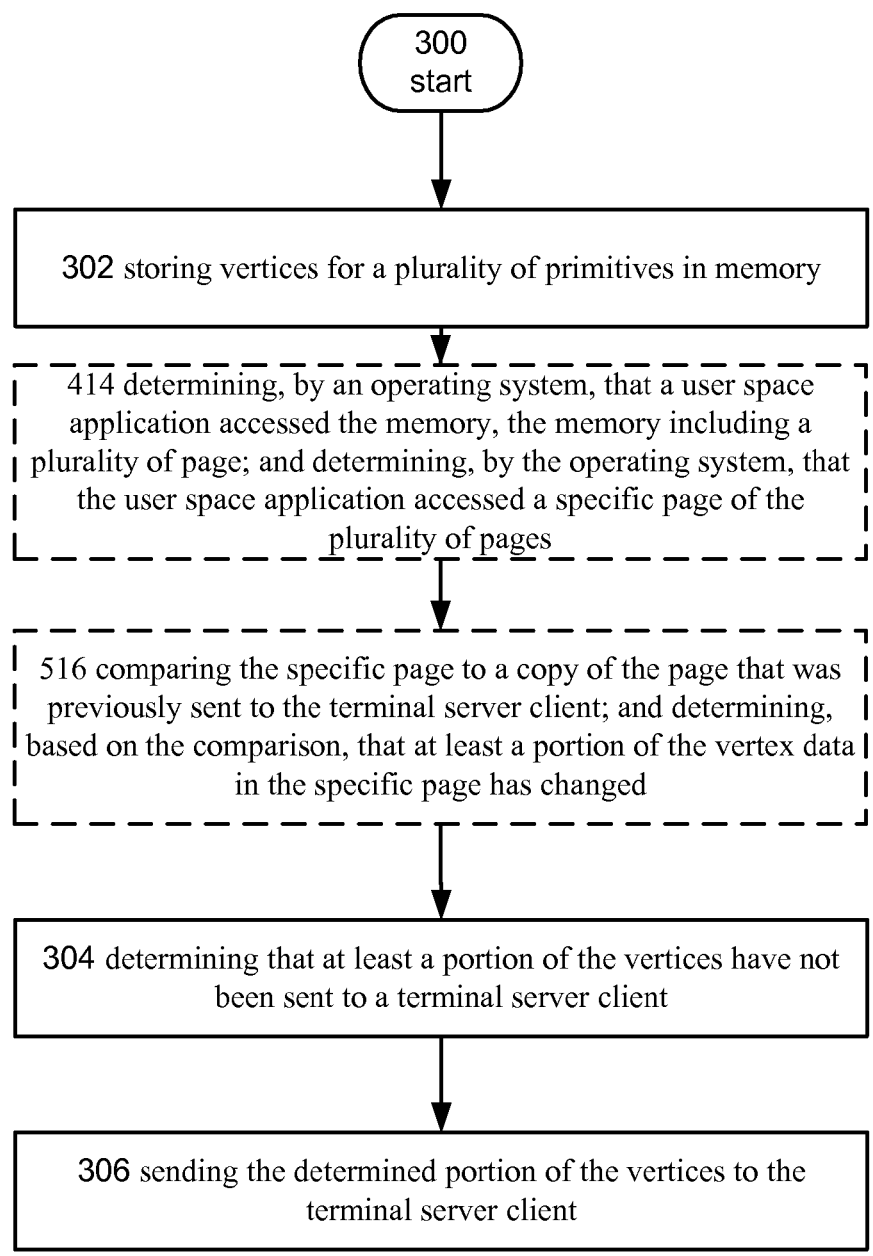
FIG. 5 depicts an alternative embodiment of the operational procedure 300 of FIG. 4.

Referring now to FIG. 5, it shows an alternative embodiment of the operational procedure of FIG. 4 including operation 516 that illustrates comparing the specific page to a copy of the page that was previously sent to the terminal server client; and determining, based on the comparison, that at least a portion of the vertex data in the specific page has changed. In the same, or other embodiment, once a page is identified it can be further scanned by the optimizer 226. For example, the optimizer 226 can be executed by the processor 212 and the processor 212 can compare the accessed page or pages to previous copies of the page or pages. For example, the optimizer 226 can have access to a copy of the most recent data that was sent to the client 201, or put another way, the optimizer 226 can have a view of the data that the client 201 currently has. The optimizer 226 can be executed and a comparison can be made between the contents of the accessed pages and the old copy of the page. If there is a difference the page and or the changed bytes can be sent to the client 201.

Figure 6:
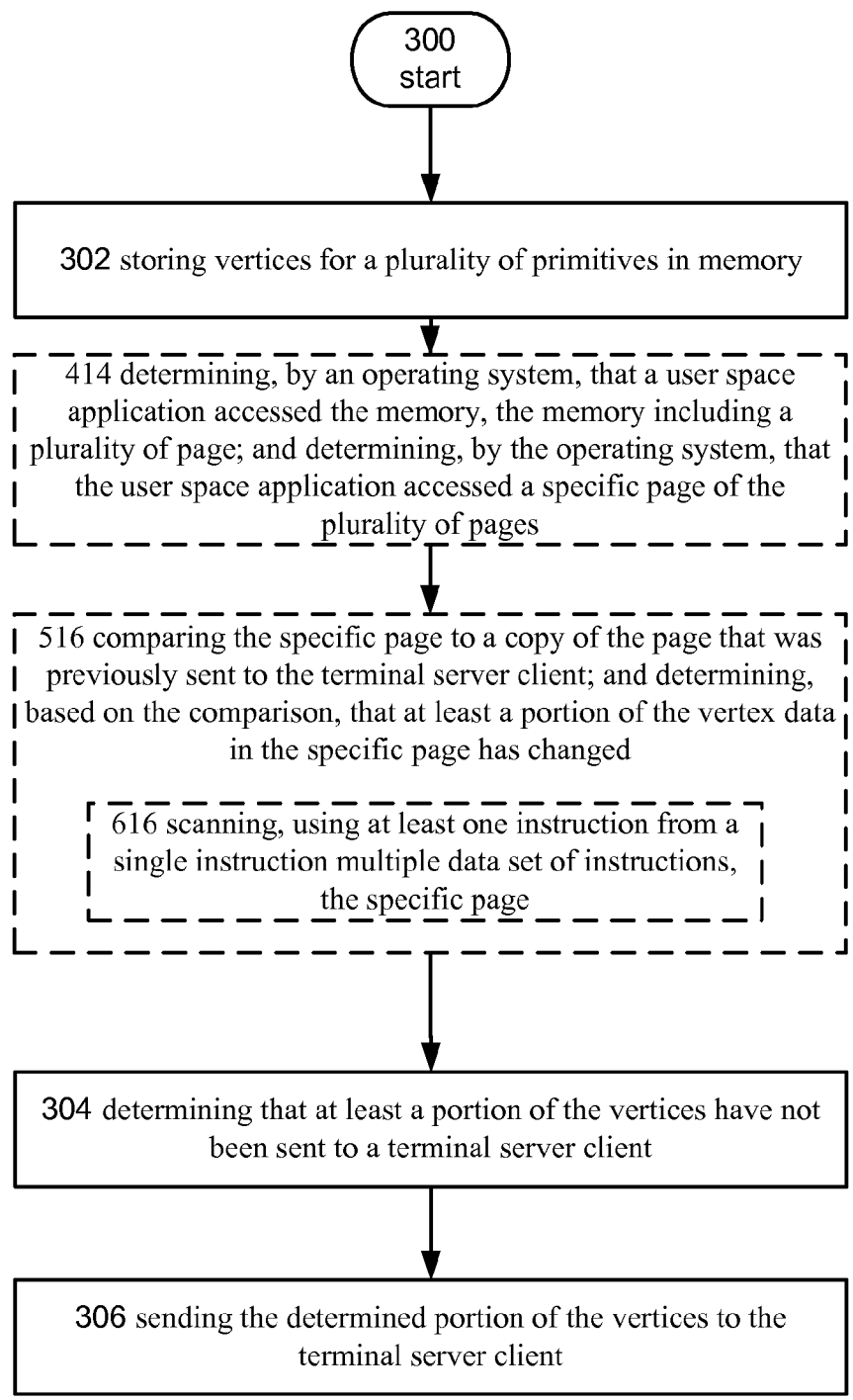
FIG. 6 depicts an alternative embodiment of the operational procedure 300 of FIG. 5.

Referring now to FIG. 6, it illustrates a further refinement to the operational procedure of FIG. 5 including operation 616 that shows that the comparison operation can further include scanning, using at least one instruction from a single instruction multiple data set of instructions, the specific page. For example, in a specific embodiment logical processor 212 can be an x86 based processor having streaming single instruction multiple data (SIMD) extensions. In this example the at least one SIMD instruction can scan a page of memory in chunks at a time and compare the copy of the bytes in the old page to the current bytes in the current page. In a specific SIMD embodiment the processor 212 can be configured to scan 16 bytes at once. Groups of 16 bytes can be loaded into the SIMD registers and a comparison can be made to the previous values, e.g., values that have been sent to the client 201, of the 16 bytes and a determination can be as to whether any of the bytes in the group have changed. In an alternative embodiment, once the optimizer 226 identifies that a group of bytes includes a change the processor 212 can execute the optimizer 226 and the processor 212 can be configured to run a comparison between each byte in the group using regular x86 instructions to identify the specific byte or bytes of data that has or have changed in the group.

Figure 7:
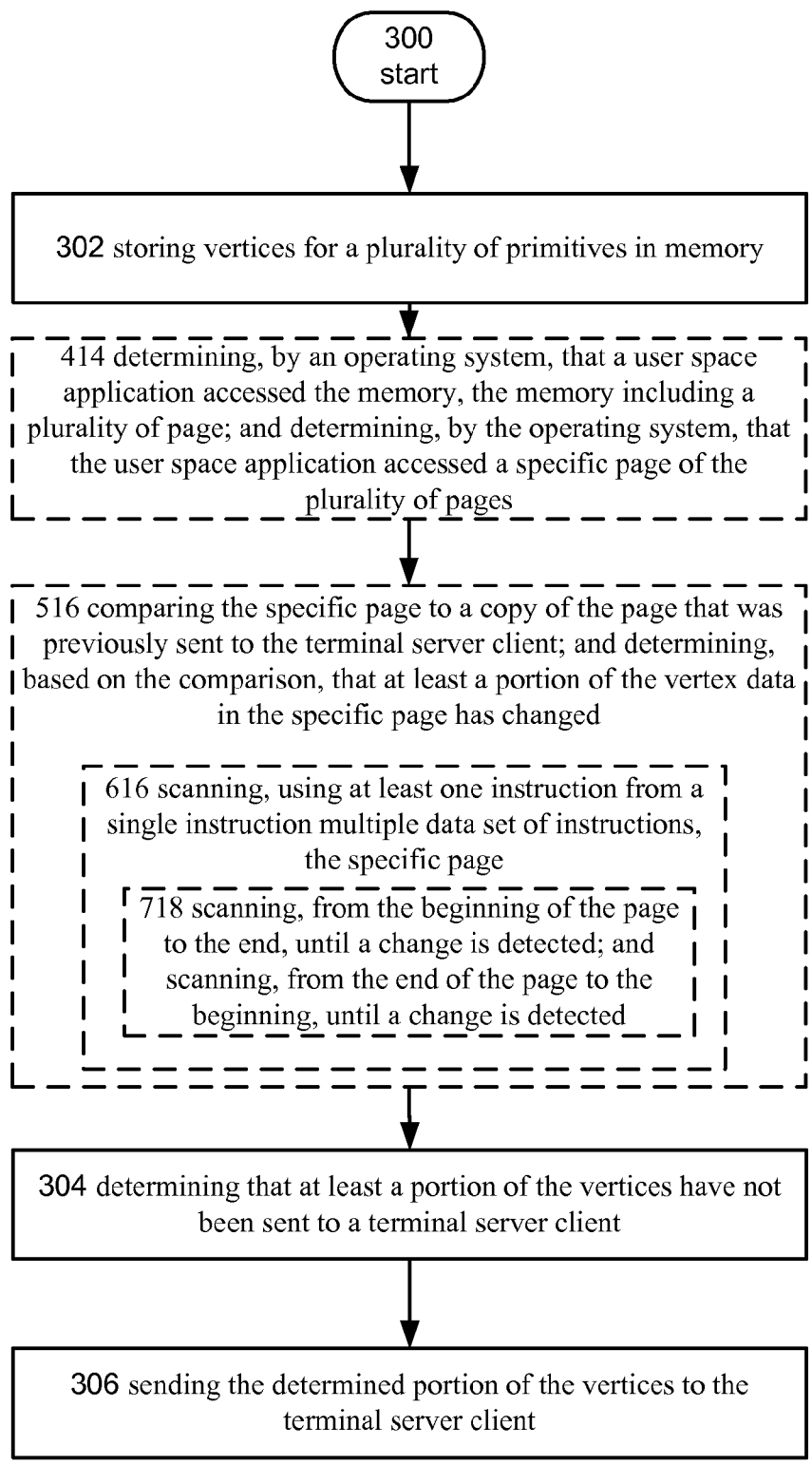
FIG. 7 depicts an alternative embodiment of the operational procedure 300 of FIG. 6.

Referring now to FIG. 7, it illustrates a further refinement to the operational procedure of FIG. 6 including operation 718 that shows that the comparison operation using SIMD instructions can additionally include the operations of scanning, from the beginning of the page to the end, until a change is detected; and scanning, from the end of the page to the beginning, until a change is detected. For example, the logical processor 212 can step through the identified pages in groups of bytes. The optimizer 226 in this example can be configured to search for bytes until a change is detected. In this example embodiment, since applications tend to modify vertices in large groups, the optimizer 226 can be configured to look until it finds the beginning and end of a group of changes instead of searching through every byte. By configuring the optimizer 226 in this manner the optimizer 226 will only spend cycles looking for differences in proportion to the amount of changes that are actually made. That is, if the application modifies a large group of vertices, the processor 212 would not have to spend a lot of cycles trying to identify all the changes.

In this alternative refinement, the processor 212 can step through the page starting from the beginning, e.g., the first address of the page, comparing bytes in groups to previous groups. If, for example a change is detected, that is, if a value indicative of a vertex has changed, the processor 212 can stop, record the memory address of the value, and start scanning from the end of the page, e.g., the last address in the page, to the beginning until a change is detected. In this example the processor 212 can select the addresses in between the two changed values as portion of the vertices that have not been sent to the terminal server client 201.

Figure 8:
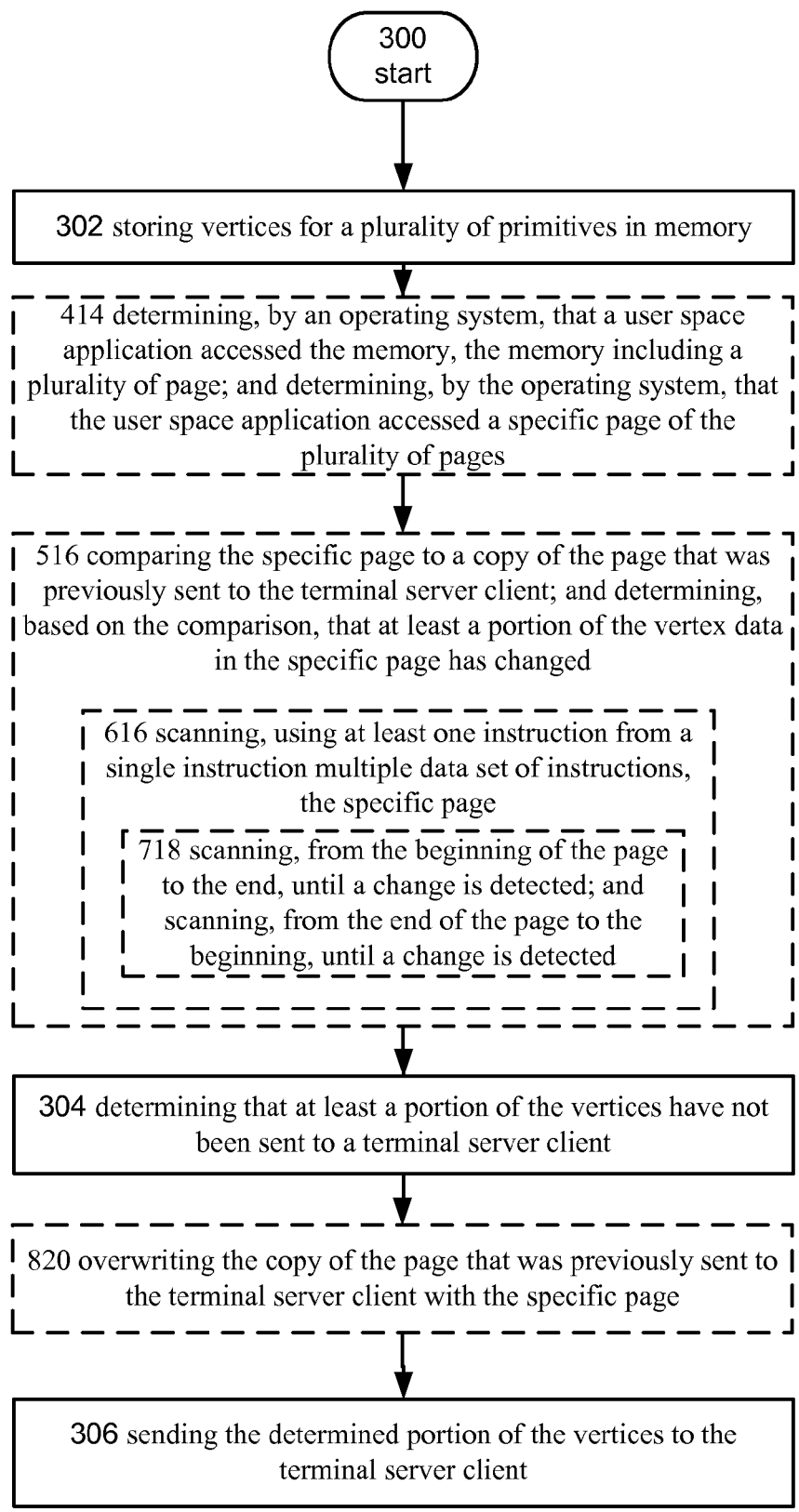
FIG. 8 depicts an alternative embodiment of the operational procedure 300 of FIG. 7.

Referring now to FIG. 8, it illustrates a further refinement to the operational procedure of FIG. 7 including an additional operation 820 that shows overwriting the copy of the page that was previously sent to the terminal server client with the specific page. In embodiments that include operation 820, once processor 212 executing the optimizer instructions identifies the portion of the vertices that have not been sent to the terminal server client 201, the processor 212 can cache the page that it just scanned by overwriting the old copy of the page in a memory area, e.g., area of RAM 214, that is configured to store a copy of the graphics data that has been sent to the terminal server client 201. For example, if the cache includes 4 pages of vertices, and the optimizer determines that a change was made in the $3^{rd}$ page, the optimizer 226 can overwrite the $3^{rd}$ page with the page that was just scanned. After the overwrite operation the optimizer 226 has a current view of the data that has been sent to the client 201.

Figure 9:
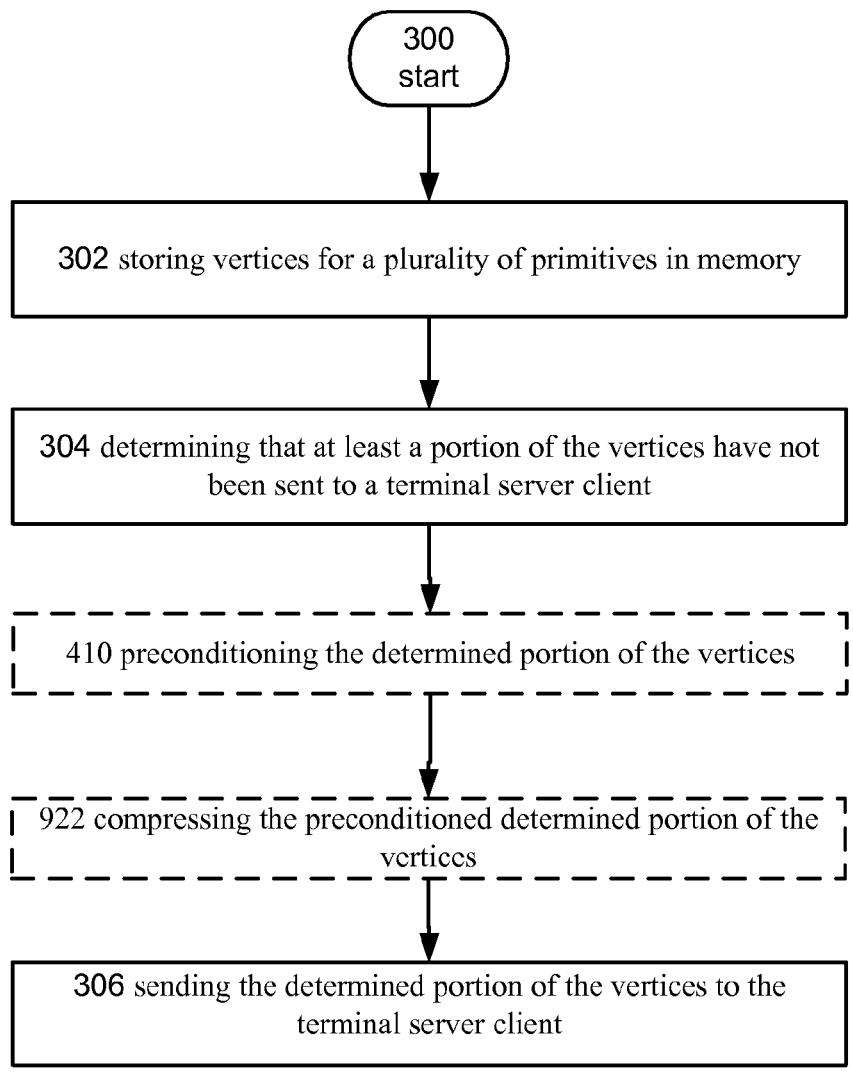
FIG. 9 illustrates an alternative embodiment of the operational procedure 300 of FIG. 4.

Referring now to FIG. 9, it illustrates a further refinement to the operational procedure of FIG. 4 including an additional operation 922 that shows compressing the preconditioned determined portion of the vertices. In this refinement, after the portion of the vertices that have not been sent to the terminal server client 201 have been preconditioned, they can be compressed using the bulk compressor 240. Generally, the bulk compressor 240 is a standard compressor that is configured to identify patterns in a run and compress them. Since the bulk compressor 240 is customized to compress diverse data, e.g., all data that is sent to the client 201 such bitmaps generated by the GDI 246, audio, clipboard data, USB devices, etc., it is not configured to compress any specific type of data. Thus, in this example the vertices sent to the client can be preconditioned, that is, placed into a format, that enables the bulk compressor 240 to more easily identify patterns.

Figure 10:
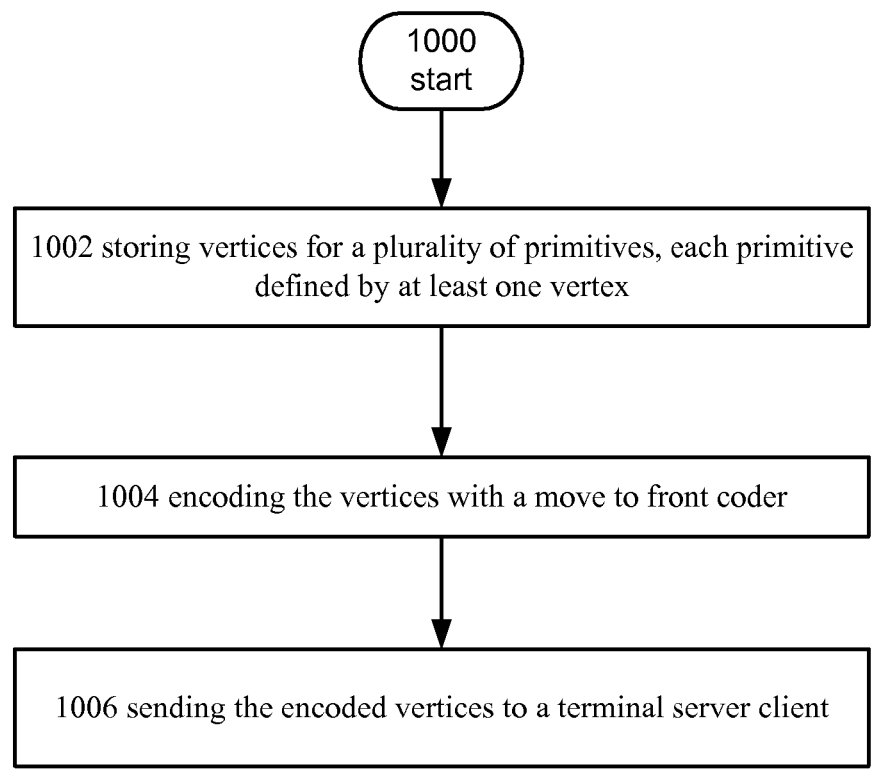
FIG. 10 illustrates an example operational procedure for practicing aspects of the present disclosure.

Turning now to FIG. 10, it illustrates an operational procedure that can be used in aspects of the present disclosure. The operational procedure begins with operation 1000 and includes operations 1002, 1004, 1006. As shown by operation 1002, the procedure includes storing vertices for a plurality of primitives, each primitive defined by at least one vertex. Referring to FIG. 2, vertex data, e.g., 32 bit values indicative of vertices, can be stored in a vertex buffer, e.g., one or more pages of memory in RAM 214 and/or memory of the graphics processor 218. In an embodiment the vertex data can be generated by, for example, the API 222 in response to receiving API constructs from an application such as, for example, a videogame, media player, CAD program, user interface, etc. That is, an application could pass the API 222 one or more constructs and the API 222 could generate thousands of primitives and store them in one or more vertex buffers.

The operational procedure 1004 continues and shows encoding the vertices with a move to front coder. For example, a processor 212 can execute instructions indicative of a move to front coder 230 (MTF encoder) and can encode the vertices. In this example the MTF encoder 230 can be configured to encode at the level of granularity that represents the data element that is being sent to the client. That is, in an example using 32 bit floats, the MTF encoder 230 can be configured to encode 32 bits at a time. By encoding at the data element level the known properties of the vertices can be exploited. That is, instead of having the MTF encoder 230 encode every bit it can be configured to encode every 32 bits because an implementer knows that the data represents a 32 bit vertex. Generally, the MTF encoder 230 includes a list of values and an index. As the MTF encoder 230 processes the vertices the most common values percolate to the top of the list and instead of emitting the values, the MTF encoder 230 can output the index value (which can be encoded in fewer bits than a vertex). Overtime the MTF encoder 230 may oscillate between the more common values thereby generating a run that the bulk compressor 240 may easily pick up and compress.

In a specific example, the list can have 4 slots, however this is a configurable amount of slots. The MTC encoder 230 could receive vertex values of [137, 16, 128, 137, 137, 128]. When the MTF encoder 230 encounters the first value '137,' the list can be checked to determine whether to emit the index value or the vertex value. Since in this example the list is empty, the 137 value can be stored in the '0' index slot and the MTF encoder 230 can emit the value 137. When the next value '16' is encountered, the MTF encoder 230 can store the 16 in the '0' index slot and shift the 137 to the '1' slot, and emit the value 16. When the third value is encountered '128,' the contents of the list can be shifted and the 128 can be emitted. When the fourth value is encountered, the MTF encoder 230 can determine that the 137 is already in the 2 slot and instead of emitting 137 the MTF encoder 230 can emit the index value '2' and information, e.g., a bit, that identifies that this is an index value. In this example, the index value can be encoded with a fewer number of bits than the vertex, thus compressing the vertex value. Moreover, at this point the MTF encoder 230 can swap, or rotate the list such that the 137 placed in the '0' index and the 128 is either placed in the '2' index slot or, if rotated, the '1' index slot. Continuing with the example, as more of the same values start to appear, the more the MTF encoder 230 will be able to emit index values and oscillate between commonly encountered values. Or put another way, the MTF encoder 230 can compress the vertices by sending index values and precondition the vertices by sending a run that can be further compressed by the bulk compressor 240.

Continuing with the description of FIG. 10, operation 1006 shows sending the encoded vertices to a terminal server client. For example, and referring to FIG. 2, the network interface card 210 can send the encoded vertices, e.g., the output emitted by the MTF coder 230, to a terminal server client 201. In this example the amount of data that needs to be sent to represent the vertices has been reduced thereby decreasing the total bandwidth necessary to perform command remoting.

Figure 11:
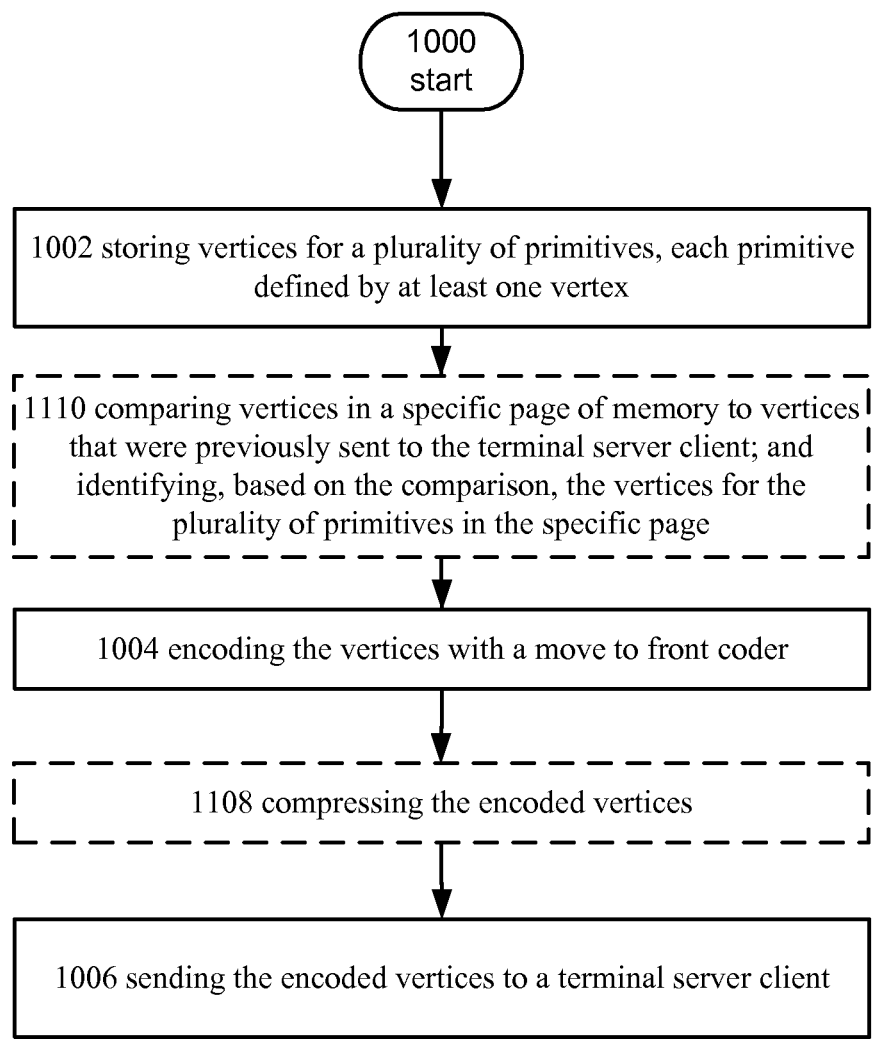
FIG. 11 illustrates an alternative embodiment to the operational procedure of FIG. 10.

Turning now to FIG. 11, it illustrates an alternative embodiment of the operational procedure 1000 of FIG. 10 including the operations 1108, and 1110. As shown by operation 1108, in an embodiment the operational procedure can include an operation that includes compressing the encoded vertices. In embodiments that include this refinement, the encoded vertices can be compressed using the bulk compressor 240. In this example the vertices received by the bulk compressor 240 may include index values that are oscillating between a couple of values and the bulk compressor 240 may be able to identify a run and compress the data.

In addition, FIG. 11 also depicts operation 1110 that shows comparing vertices in a specific page of memory to vertices that were previously sent to the terminal server client; and identifying, based on the comparison, the vertices for the plurality of primitives in the specific page. For example, the vertices that the MTF encoder 230 receives could be received from the optimizer 226. In this configuration the optimizer 226 could be configured to identify changes to vertices made by applications and send the changes to the MTF encoder 230 for further compression. Similar to that described above, the optimizer 226 can be executed by the processor 212 and the processor 212 can compare a page or pages to previous copies of the page or pages. The optimizer 226 can be executed and a comparison can be made between the contents of the accessed pages and the old copy of the page. If there is a difference the page and or the changed bytes can be sent the MTF coder 230.

Figure 12:
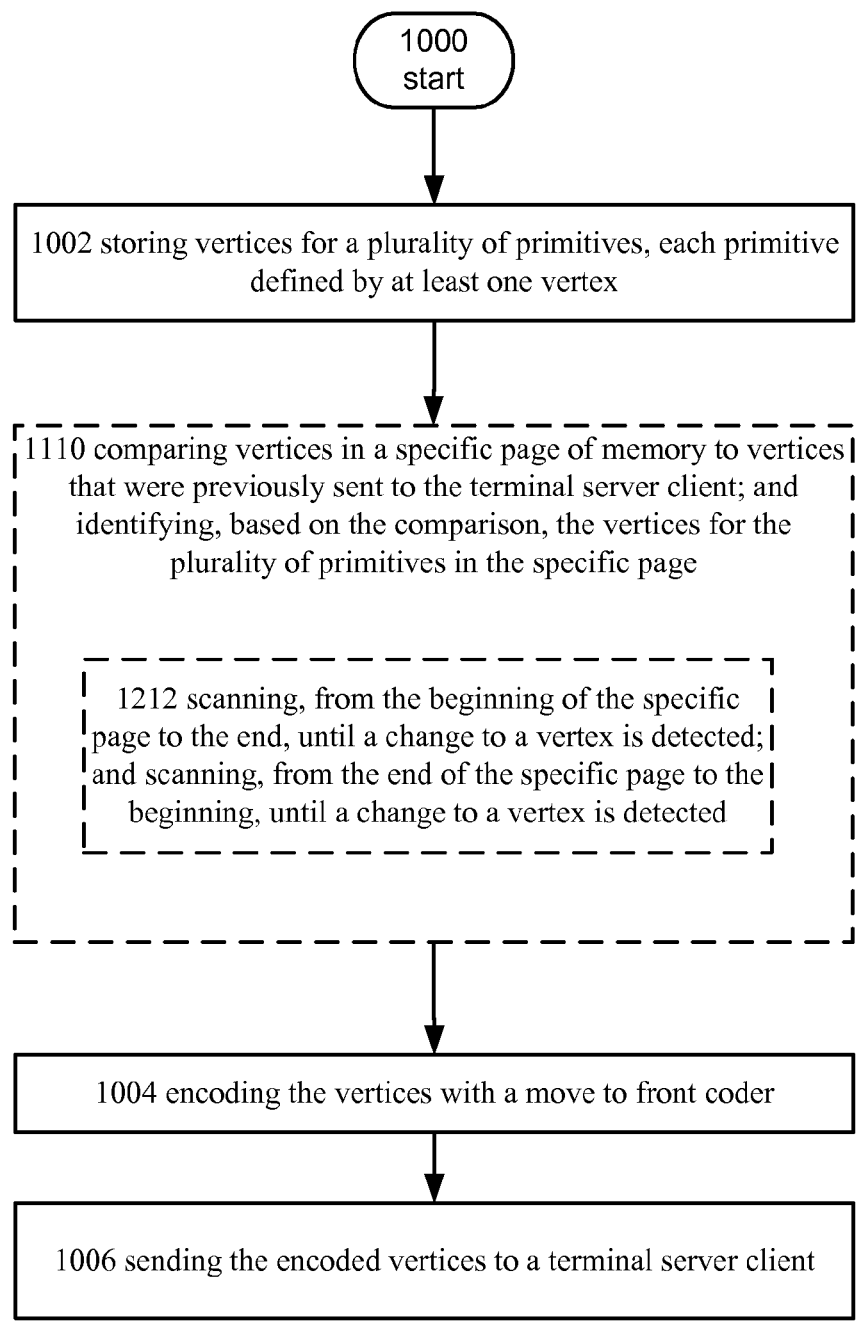
FIG. 12 illustrates an alternative embodiment to the operational procedure of FIG. 11.

Referring now to FIG. 12, it shows operation 1212, which is a refinement to operation 1110. As shown by the figure, operation 1212 shows scanning, from the beginning of the specific page to the end, until a change to a vertex is detected; and scanning, from the end of the specific page to the beginning, until a change to a vertex is detected. For example, in an embodiment the logical processor 212 can step through the specific pages in groups of bytes.

Figure 13:
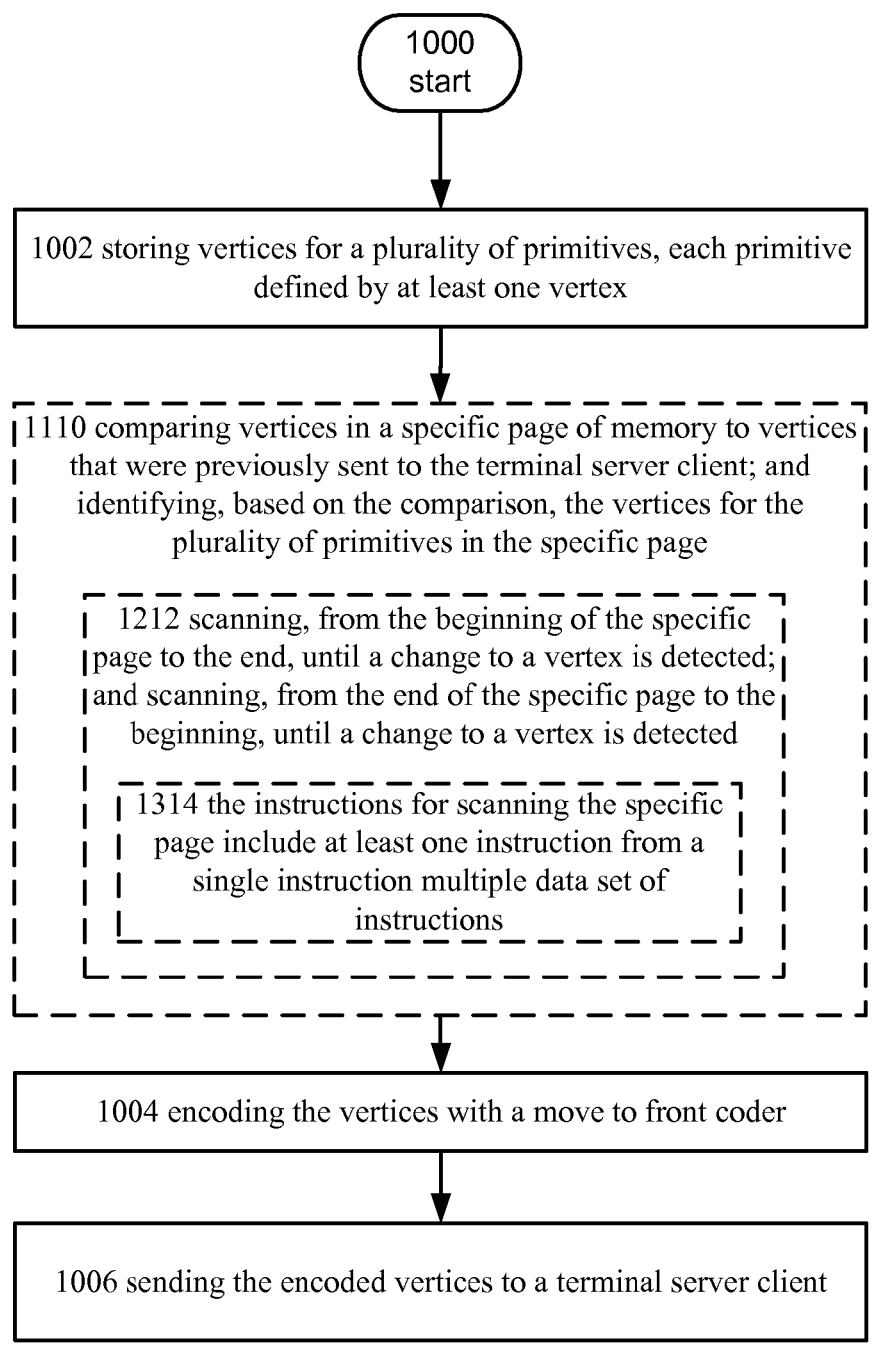
FIG. 13 illustrates an alternative embodiment to the operational procedure of FIG. 12.

Referring now to FIG. 13, it shows an operation 1314 that shows a further refinement to the operational procedure of FIG. 12. In this embodiment, the instructions for scanning the specific page include at least one instruction from a single instruction multiple data set of instructions. For example, the logical processor can be an x86 based processor having streaming single instruction multiple data (SIMD) extensions. In this case the SIMD instructions can scan a page of memory in chunks at a time using a single processor instruction.

Figure 14:
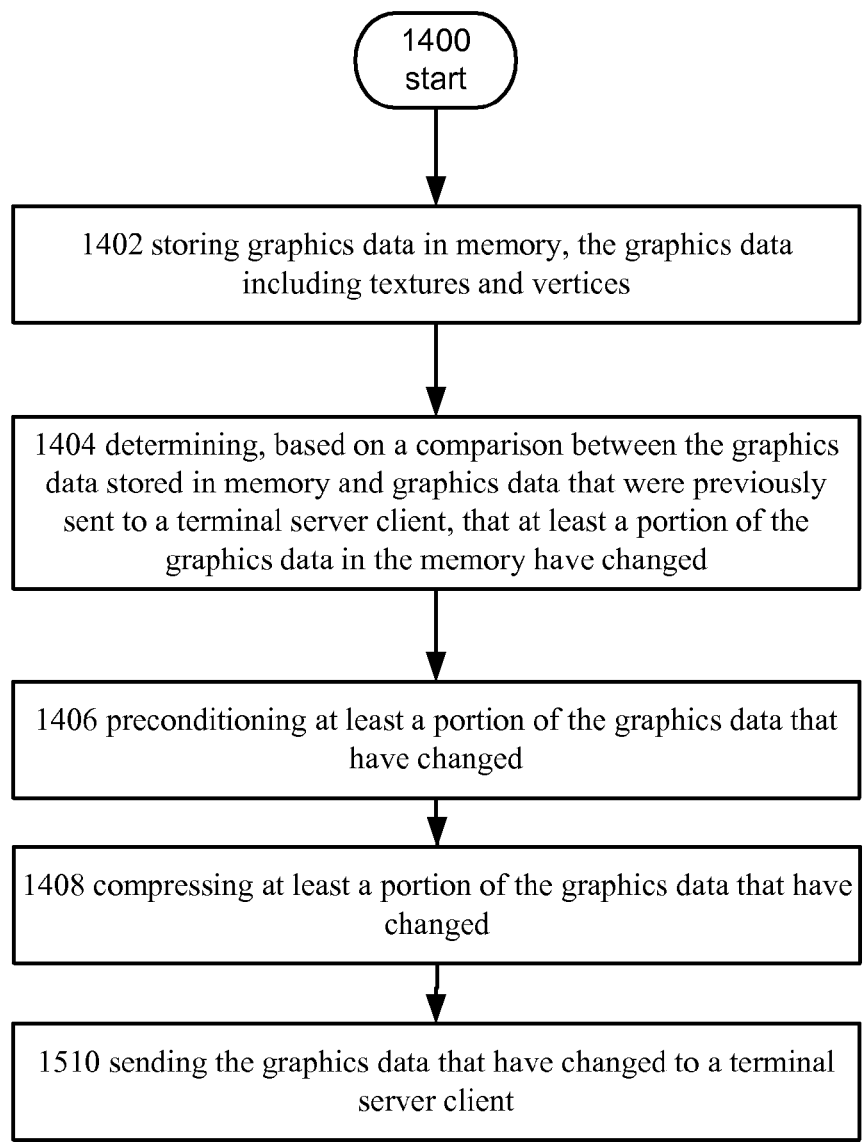
FIG. 14 illustrates an example operational procedure for practicing aspects of the present disclosure.

Referring now to FIG. 14, it shows an operational procedure including operations 1400-1412. Operation 1400 beings the procedure and operation 1402 shows storing graphics data in memory, the graphics data including textures and vertices. Referring to FIG. 2, in an embodiment vertex data, e.g., 32 bit values indicative of vertices, can be stored in a vertex buffer, e.g., one or more pages of memory in RAM 214 or memory of the graphics processor and textures, e.g., surface properties such as surface normals can be stored in pages of RAM 214. In an embodiment the vertex data can be generated by, for example, the API 222 in response to receiving a construct from an application such as, for example, a videogame, media player, CAD program, user interface. The application, via the API 222, could map one or more pages of memory with vertices or textures. Or put another way, the application can invoke one or more functions of the API 222 to write a plurality of vertices to memory that can be used by a driver to direct a graphics processor to generate a plurality of primitives. Similarly, the application can send constructs to the API 222 and the API 222 can generate commands to map textures to primitives that can be stored in memory along with the texture.

Continuing with the description of FIG. 14, operation 1404 shows determining, based on a comparison between the graphics data stored in memory and graphics data that were previously sent to a terminal server client, that at least a portion of the graphics data in the memory have changed. For example, in an embodiment the API 222 can map vertex buffers, e.g., pages of memory and store textures in memory and the optimizer 226 can be executed by the processor 212 in order to determine whether any of the data stored by the application has changed since a previous map operation. For example, the optimizer 226 can have access to a copy of the most recent data that was sent to the client 201 or put another way, the optimizer 226 can have a view of the data that the client 201 currently has.

The optimizer 226 can additionally compare the textures to textures sent to the client 201 to determine whether any data has changed. For example, the textures are essentially arrays of pixel values, e.g., bitmaps, and the optimizer 226 can scan the pages of memory that store the textures to determine whether any textures have changes. If the processor 212 detects that a page of memory including a texture or a portion of a texture that has been touched, that is, accessed, then the optimizer 226 can determine to send the page to client 201. In another example embodiment the optimizer 226 can scan the contents of the page that has been touched to identify what bytes have changed. In this example instead of starting from the beginning or end of the page, the optimizer 226 can scan the page starting from the middle address and expand outwards like a rectangle.

The optimizer 226 can be executed and a comparison can be made between the contents of the accessed pages and the old copy of the page. If there is a difference the page and/or the changed bytes can be sent to the client 201. In certain embodiments the processor 212 can step through the page comparing bytes or groups of bytes using SIMD instructions.

Continuing with the description of FIG. 14, operation 1406 shows preconditioning at least a portion of the graphics data that have changed. For example, in an embodiment of the present disclosure the graphics data can be preconditioned for being compressed. In this example the values, e.g., the bits, that represent the vertices and/or textures can be translated into a different form such that the bulk compressor 240 can more easily identify patterns and thus give the bulk compressor more opportunity to compress.

Continuing with the description of FIG. 14, operation 1408 depicts compressing at least a portion of the graphics data that have changed. In this example the graphics data can be compressed using, for example, bulk compressor 240.

Continuing with the description of FIG. 14, operation 1410 depicts sending the graphics data that have changed to a terminal server client. For example, and referring to FIG. 2, the network interface card 210 can send the graphics data that have changed to the terminal server client 201. In this example, since the amount of graphics data that need to be sent over the network has been reduced, the total bandwidth necessary to perform command remoting has been decreased.

Figure 15:
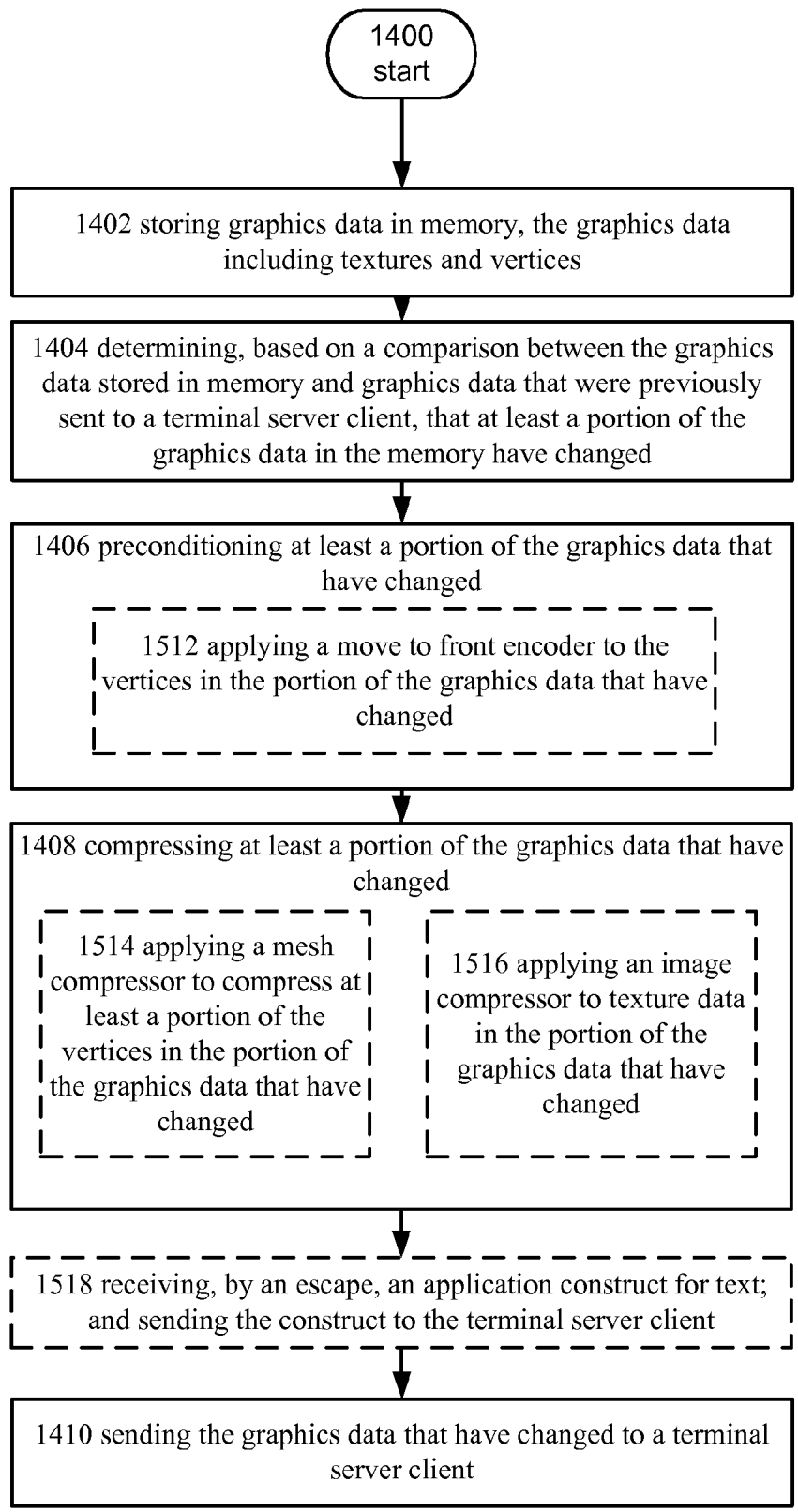
FIG. 15 illustrates an alternative embodiment to the operational procedure of FIG. 14.

Turning now to FIG. 15, it shows an alternative embodiment of the operational procedure 1400 of FIG. 14 including the operations 1512, 1514, 1516, and 1518. Referring now to operation 1512 it shows a refinement to operation 1406, namely applying a move to front encoder to the vertices in the portion of the graphics data that have changed. Similar to operation 1004, in an embodiment processor 212 can execute instructions indicative of a move to front coder 230 and can encode vertices, texture values, and or commands for mapping textures to primitives. In this example the MTF encoder 230 can be configured to encode on the data element level in order to exploit known properties of the graphics data.

Continuing with the description of FIG. 15, operation 1514 shows a refinement to operation 1408, showing applying a mesh compressor to compress at least a portion of the vertices in the portion of the graphics data that have changed. For example, in an embodiment the API 222 can be configured to include a flag that can be set by the application which indicates that certain vertex data is part of a mesh, e.g., a collection of connected primitives that form a 3D object. In this case, the same flag or a different flag can be used to indicate to the API 222 that lossy compression techniques can be used on the mesh. In this example, if the flag is set, the vertices associated with the flag can be passed to the mesh compressor 236 and the vertices can be compressed.

In an embodiment a mesh optimizer can execute on the client 201 and can be used to reconstruct the compressed vertices. One such example mesh optimizer could execute on the client 201 to recreate the vertices that were lost in the lossy compression operation.

Turning to operation 1516, in an embodiment the operation 1408 can be further refined by applying an image compressor to texture data in the portion of the graphics data that have changed. For example, one of a plurality of image compressors can be used to compress texture data. Since textures are essentially bitmap images, in certain embodiments different compressors can be used to reduce the amount of bandwidth needed to send the textures. In certain embodiments the compressor 232 can be lossless or lossy depending on the textures and how the application intends to use the texture. In this embodiment the API 222 could expose a flag that can be set by the application to indicate that lossy compression is acceptable for textures in certain pages of memory, otherwise a lossless compressor may be used to compress the texture. In this example, the appropriate compressor can be dynamically selected based on the available CPU cycles and the selection of the flag. Some example compressors could include, but are not limited to run-length encoders, JPEG compressors, or DirectX compressors.

Referring now to operation 1518 it shows receiving, by an escape, an application construct for text; and sending the construct to the terminal server client. Generally, it cost less bandwidth to send API constructs instead of the multitude of API primitives that result from processing constructs. In certain cases high level escapes can be added to the API 222 that can improve the ability to remote primitives such as the primitives that form Direct2D text. Generally when a D2D application, such as a word processor, passes the API 222 a construct to generate the letter 'A' the API 222 generates primitives from the construct and stores them in a vertex buffer. The construct that is passed to the API 222 represents an 'A,' however the information that identifies the 'A' is lost in the vertices that are generated by the API 222. Thus, in this example embodiment when the API 222 receives such a construct, the escape can capture the construct and send it to the client 201 via the NIC 210. The client 201 can in this case receive the construct and use it to reconstruct the vertex buffer. In the same, or other embodiments the construct can be compressed or preconditioned using one of the previously disclosed techniques.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method, comprising:
   generating a second plurality of vertices for a plurality of primitives, the second plurality of vertices being associated with a second bitmap image;
   sending at least part of the second plurality of vertices to a client computer across a communications network;
   after sending at least part of the second plurality of vertices, generating a first plurality of vertices for a plurality of primitives, the first plurality of vertices being associated with a bitmap image generated at a time subsequent to a time when the second bitmap image was generated; storing the first plurality of vertices in a memory;
   determining that a first vertex of the first plurality of vertices has not been sent to a client as part of the second plurality of vertices;
   in response to determining that the first vertex has not been sent to the client as part of the second plurality of vertices because the first vertex is used to create the bitmap image but is not used to create the second bitmap image, sending the first vertex to the client; and
   in response to determining that a second vertex of the first plurality of vertices has already been sent to the client as part of the second plurality of vertices because the second vertex is used to create the bitmap image and is used to create the second bitmap image, determining not to send the second vertex to the client as part of the first plurality of vertices.

2. The method of claim 1, further comprising:
   determining that a user space application has requested a range of memory addresses that is larger than a predetermined range prior to determining that the first vertex has not been sent to the client, and sending the first vertex to the client;
   determining that the user space application has requested a second range of memory addresses that is smaller than the predetermined range, the second range of memory addresses storing a third plurality of vertices; and
   in response to determining that the second range of memory addresses is smaller than the predetermined range, sending the third plurality of vertices to the client without checking whether a vertex of the third plurality of vertices has previously been sent to the client.

3. The method of claim 1, further comprising: preconditioning the first vertex.

4. The method of claim 1, wherein sending the first vertex to the client further comprises:
   sending a determined delta between a second vertex of the first plurality of vertices and the first vertex, the second vertex having not been sent to the client as part of the second plurality of vertices.

5. The method of claim 1, further comprising:
   determining, by an operating system, that a user space application accessed the memory, the memory comprising a plurality of memory pages stored in a hardware memory; and
   determining, by the operating system, that the user space application accessed a specific memory page of the plurality of memory pages.

6. The method of claim 5, further comprising:
   comparing the specific memory page to a copy of the memory page that was previously sent to the client; and
   determining, based on the comparison, that at least a portion of vertex data stored in the specific memory page has changed.

7. The method of claim 6, wherein comparing the specific memory page to the copy of the memory page that was previously sent to the client further comprises:
   scanning, using at least one instruction from a single instruction multiple data (SIMD) set of instructions executed on a SIMD processor, the specific memory page.

8. The method of claim 7, wherein scanning the specific memory page further comprises:
   scanning, from the beginning of the memory page to the end, until a change is detected; and
   scanning, from the end of the memory page to the beginning, until a change is detected.

9. The method of claim 8, further comprising:
   overwriting the copy of the memory page that was previously sent to the client with the specific memory page.

10. The method of claim 3, further comprising: compressing the preconditioned first vertex before sending the preconditioned first vertex to the client.

11. A non-volatile computer readable hardware device comprising processor executable instructions that, when executed on a computer, cause the computer to perform operations comprising:
    generating a second plurality of vertices for a plurality of primitives, the second plurality of vertices being associated with a second bitmap image;
    sending at least part of the second plurality of vertices to a client computer across a communications network;
    after sending at least part of the second plurality of vertices, generating a first plurality of vertices for a plurality of primitives, the first plurality of vertices being associated with a bitmap image subsequent to the second bitmap image;
    determining that a first vertex of the first plurality of vertices has not been sent to a client as part of the second plurality of vertices;
    in response to determining that the first vertex has not been sent to the client as part of the second plurality of vertices, sending the first vertex to the client; and
    in response to determining that a second vertex of the first plurality of vertices has already been sent to the client as part of the second plurality of vertices, determining not to send the second vertex to the client as part of the first plurality of vertices.

12. The computer readable hardware device of claim 11, further bearing processor executable instructions that, when executed on the computer, cause the computer to perform operations comprising:

compressing the first vertex before sending the first vertex to the client.

13. The computer readable hardware device of claim 11, further bearing processor executable instructions that, when executed on the computer, cause the computer to perform operations comprising:

comparing vertices in a specific page of memory to vertices that were previously sent to the client; and
identifying, based on the comparison, the vertices for the plurality of primitives in the specific page of memory.

14. The computer readable hardware device of claim 13, wherein comparing vertices in a specific page of memory to vertices that were previously sent to the client further comprises:

scanning, from the beginning of the specific page of memory to the end, until a change to a vertex is detected; and
scanning, from the end of the specific page of memory to the beginning, until a change to a vertex is detected.

15. The computer readable hardware device of claim 14, wherein scanning the specific page of memory includes processing at least one instruction from a single instruction multiple data (SIMD) set of instructions.

16. A computer system, comprising: a processor; and
a memory bearing processor-executable instructions that, when executed on the processor, cause the system at least to:

generate a second plurality of vertices for a plurality of primitives, the second plurality of vertices being associated with a second bitmap image;
send at least part of the second plurality of vertices to a client computer across a communications network;
after sending at least part of the second plurality of vertices, generate a first plurality of vertices for a plurality of primitives, the first plurality of vertices being associated with a bitmap image subsequent to the second bitmap image;
store graphics data in memory, the graphics data including textures and vertices, the graphics data being associated with a first bitmap image;
determine, based on a comparison between the graphics data stored in memory and graphics data that were previously sent to a client, that at least a portion of the graphics data in the memory have changed, the graphics data that was previously sent to the client being associated with a bitmap image previous to the first bitmap image; precondition at least the portion of the graphics data that have changed; compress at least the portion of the graphics data that have changed; in response to determining that at least the portion of the graphics data that have been changed has not been sent to the client as part of the second plurality of vertices, send the graphics data that have changed to the client; and
in response to determining that, based on the comparison between the graphics data stored in memory and graphics data that were previously sent to the client, that at least a portion of the graphics data in the memory have not changed, determining not to send the portion of the graphics data in the memory that have not changed to the client.

17. The computer system of claim 16, wherein the instructions that, when executed on the processor cause the system at least to precondition at last the portion of the graphics data that have changed further cause the system at least to:

apply a move to front encoder to the vertices in the portion of the graphics data that have changed, the move to front coder replacing each vertex of the vertices with a symbol representing that vertex, and moving the symbol to the front of a list of symbols used to represent vertices.

18. The computer system of claim 16, wherein the instructions that, when executed on the processor cause the system to at least to compress at least the portion of the graphics data that have changed further cause the system to at least: at least to:

apply a mesh compressor to compress at least a portion of the vertices in the portion of the graphics data that have changed.

19. The computer system of claim 16, wherein instructions that, when executed on the processor cause the system at least to compress at last the portion of the graphics data that have changed further cause the system at least to:

apply an image compressor to texture data in the portion of the graphics data that have changed.

20. The computer system of claim 16, wherein the memory further bears instructions that, when executed on the processor, cause the system at least to:

receive, by an escape, an application construct for text; and send the construct to the client.

* * * * *